(12) United States Patent
Skjaerbaek

(10) Patent No.: US 8,708,110 B2
(45) Date of Patent: Apr. 29, 2014

(54) BRAKE DEVICE

(75) Inventor: Erik Skjaerbaek, Svendborg (DK)

(73) Assignee: S.B. Patent Holdings ApS, Vejstrup (DK)

( * ) Notice: Subject to any disclaimer, the term of this patent is extended or adjusted under 35 U.S.C. 154(b) by 615 days.

(21) Appl. No.: 12/307,998

(22) PCT Filed: Jul. 17, 2006

(86) PCT No.: PCT/DE2006/001249
§ 371 (c)(1),
(2), (4) Date: Jan. 8, 2009

(87) PCT Pub. No.: WO2008/009246
PCT Pub. Date: Jan. 24, 2008

(65) Prior Publication Data
US 2009/0294225 A1    Dec. 3, 2009

(51) Int. Cl.
*F16D 55/08*    (2006.01)
*F16D 55/16*    (2006.01)

(52) U.S. Cl.
USPC ....... 188/72.8; 188/71.9; 188/72.1; 188/72.3; 188/72.6; 188/72.7; 188/106 F; 188/106 P; 188/156; 188/157; 188/158; 188/196 D; 188/196 V

(58) Field of Classification Search
USPC .......... 188/72.1, 72.3, 72.6, 72.7, 72.8, 71.9, 188/73.1, 78, 156, 158, 162, 329, 1.11 L, 188/1.11 E, 196 D, 196 F, 196 M
See application file for complete search history.

(56) References Cited

U.S. PATENT DOCUMENTS

| | | | |
|---|---|---|---|
| 2,199,234 A | | 4/1940 | Arndt |
| 3,638,763 A | * | 2/1972 | Laverdant ............. 188/72.6 |
| 4,056,173 A | * | 11/1977 | Farr .................... 188/71.9 |
| 6,478,120 B2 | * | 11/2002 | Runkel et al. ......... 188/71.9 |
| 6,481,543 B1 | * | 11/2002 | Shaw et al. ........... 188/71.9 |
| 2004/0112690 A1 | * | 6/2004 | Sekiguchi ............. 188/72.7 |
| 2004/0245055 A1 | * | 12/2004 | Gerard et al. ......... 188/72.6 |

FOREIGN PATENT DOCUMENTS

| | | |
|---|---|---|
| DE | 202 03 794 U1 | 7/2003 |
| DE | 10 2005 038 243 | 2/2007 |
| JP | 05-060157 | 3/1993 |
| JP | 8141925 | 6/1996 |
| JP | 2005-219142 | 8/2005 |

* cited by examiner

*Primary Examiner* — Robert A Siconolfi
*Assistant Examiner* — San Aung
(74) *Attorney, Agent, or Firm* — Dykema Gossett PLLC

(57) ABSTRACT

The invention relates to a brake device for braking a moving brake body (2) by means of pressing a brake element (3, 4) onto the brake body (2), wherein a conversion device (7) is provided for converting a rotational movement of a brake drive shaft (9) into a translational movement of the brake element (4) in the direction of the brake body (2), wherein a rotary percussion mechanism (8) is connected between the brake drive shaft (9) and the conversion device (7).

16 Claims, 1 Drawing Sheet

BRAKE DEVICE

BACKGROUND OF THE INVENTION

The invention relates to a brake device for reducing the speed of a moving body by braking.

The relevant safety regulations for wind power plants dictate that two mutually completely independent and redundant brake systems are required. In older wind power plants these redundant brake systems are realized in the form of brakes which can be operated independently from each other, in which case an external system had usually been designed aerodynamically and a brake system had been designed mechanically. In modern wind power plants both brake systems may be realized as aerodynamic brakes with mechanical systems for twisting the rotor blades about their longitudinal axes, approximately normal to the rotor axis. In such installations with single blade adjustment or so-called pitch installations mechanical brakes are no longer required as an elementary component of the safety concept. However, even in these modern wind power plants mechanical brakes are employed in order to allow stopping of the rotor after aerodynamic braking.

Maintenance work in the region of the rotor or the rotor recess, respectively, is only possible once the rotor has come to a complete standstill. The mechanical rotor brakes employed for this purpose are also referred to as service and support brakes. For this purpose, in older plants, hydraulic brakes are normally also used for decelerating the rotation of the rotor. In compact structures, such hydraulic brakes allow to generate particularly high clamping and braking forces. In addition, hydraulic brakes attain a response performance which provides the full braking power within a very short period of time. However, it has been shown that when using these conventional hydraulic and electro-mechanical brakes as service and support brakes, in addition to the aerodynamic brake, brought about by blade adjustment, damage to the brakes themselves and the components which have been stopped may occur.

Although electro-mechanical brake calipers serving as service and support brakes for wind power plants have relatively high braking forces, which, moreover, can be increased by interconnecting a transmission system, the electro-mechanical brake caliper per se does, however, not have the compactness which can be attained by a hydraulic brake caliper. It is understood that this consideration does not take into account that further system components are required for generating hydraulic pressure. The known pneumatic brake calipers likewise do not attain the desired compactness since the forces of a pneumatic power generator are always less than those of a hydraulic power generator of identical size.

SUMMARY OF THE INVENTION

It is, therefore, the object of the invention to provide an electro-mechanical brake caliper which is capable of generating high braking forces and which is designed in a very compact manner.

This object is attained in accordance with the invention by a brake device for reducing the speed of a moving brake body by pressing a brake element onto the brake body, a conversion means for converting a rotational movement of a brake drive shaft into a translation movement of the brake element in the direction towards the brake body being provided, characterized in that a rotary impact mechanism is fitted between the brake drive shaft and the conversion means.

Advantageous further developments of the inventive concept form the subject of the subsidiary claims.

In the brake device according to the invention for reducing the speed of a moving brake body, in particular a brake disk, a brake element is pressed onto the brake body. A conversion means, for example a spindle drive, serves to convert a rotational movement of a brake drive shaft into a translational movement of the brake element to be pressed onto the brake body. The brake device according to the invention provides that a rotary impact mechanism is fitted between the brake drive shaft and the conversion means. A rotary impact mechanism operating according to the operating principle of an impact screw drive mechanism creates percussive energy in a tangential direction, so that high traction forces can be attained which in a brake may be equated with high braking forces.

The advantage of the brake device according to the invention is that only minimal space is required for the rotary impact mechanism so that very high clamping forces result in these electro-mechanical brake calipers. Such brake calipers may be used both in translationally moved as well as in rotating brake bodies, i.e. in brake disks. The operating principle of the brake device is not limited to one concrete application. However, the brake device claimed may be employed particularly advantageously in systems where high braking forces are to be brought about, simultaneously having the smallest possible installation size, such as, for example, in service and support brakes of wind power plants. Examples of application based on similar problem definitions, i.e. where high braking forces are required in small spaces, are to be found in a multitude of industrial applications, but also in motor vehicle technology, in particular railway technology.

In a preferred embodiment, the rotary impact mechanism is composed of an impact armature and a driving wheel, the said impact armature and the driving wheel being pressed against one another by an elastic force so that the impact armature and the driving wheel are in engagement with one another via axially projecting drivers, and that a torque can be transmitted from the brake drive shaft to the conversion means. By overcoming the elastic force and by separating the interlocked armature from the driving wheel by shifting the brake drive shaft into the axial direction, a transfer or transposition of the impact armature occurs, so that an impact impulse in the tangential direction is exerted on the driving wheel when rotation continues. In this configuration the driving wheel is preferably arranged in an axially stationary manner while the impact armature can be displaced in the axial direction and is impinged by the elastic force.

In practice, the rotary impact mechanism may be a V-grooved impact mechanism, wherein, for example, V-shaped grooves are formed in the driving wheel, into which drivers of the impact armature, projecting in axial direction and designed as cams, engage. This configuration has the advantage that it requires a very short building length in the axial direction of the rotary impact mechanism.

In principle, it is also conceivable for the rotary impact mechanism to be a cam impact mechanism, wherein drivers are provided both on the driving wheel as well as on the impact armature, projecting in the axial direction and entering into mutual engagement for torque transmission.

It is important for the mode of operation of the rotary impact mechanism that a transfer of the impact armature occurs when a set desired torque is exceeded. This is realized in the brake device according to the invention in that the impact armature, via a driving pin, is in engagement with a helical control groove of the brake drive shaft. If the brake device is to be activated, i.e. if the brake element is to be shifted from a free-wheeling position into a braking position, a torque is first applied via the brake drive shaft, which torque, via the impact armature, the drivers and the driving wheel, is applied to the conversion means, moving the brake element into the direction towards the brake body. If the brake element abuts against the brake body, the driving wheel comes to a stop. This consequently stops the impact armature from turning further while the rotation of the brake drive shaft continues. The control groove is now configured in such a manner that the driving pin of the impact armature in the helical control groove is guided as in a shifting gate and is shifted in the axial direction so that the impact armature is released from the driving wheel in the axial direction. As the impact armature is transferred, i.e. is no longer in engagement with the driving wheel, it is rapidly accelerated by the rotational movement of the brake drive shaft and is simultaneously pressed once again into the direction towards the driving wheel by the elastic force so that the result is an immediate re-engagement between the impact armature and the driving wheel. The abrupt impulse causes the driving wheel to continue turning slightly, so that the braking force onto the brake body increases further. This process recurs repeatedly until it is ensured that no greater braking force can be applied to the brake body.

It is, therefore, not only the elastic force, pressing the impact armature against the driving wheel, which has a significant influence on the braking torque, but also the mass of the impact armature. It is considered advantageous for the brake drive shaft to be surrounded by a helical spring exerting the elastic force on the impact armature, since high elastic forces can be brought about in this manner in a very small space.

The driving wheel as such is advantageously coupled directly to the conversion means. The connection is, in particular, realized in an integral manner. Particularly preferably the driving wheel forms an integral part of a threaded spindle of the conversion means. This threaded spindle engages in a threaded cup which can be shifted in the axial direction and which is guided in a housing of the brake device. The threaded cup, in turn, is connected to the brake element and brings about the actual braking process by axial displacement. It is considered advantageous for the brake element to be adjustable from a free-wheeling position into a brake position by at least one complete rotation, preferably a plurality of rotations of the threaded spindle. The pitch of the threaded spindle may be so selected that the conversion means is self-locking. In this case, the drive unit coupled to the brake drive shaft may be switched off without the risk of the braking force fading.

A substantially more compact design is attained with the brake device according to the invention than would have been possible with a directly coupled spindle drive. Moreover, the self-locking feature permits locking the brake device which is not readily realizable, i.e. not without additional valve means, in hydraulically and pneumatically operated pistons. In this context, it is important that once the braking torque has been applied, this is preserved even if the energy for operating the brake drive shaft is no longer available.

The drive energy for operating the brake drive shaft may be brought about electrically, pneumatically, hydraulically or via a motor.

BRIEF DESCRIPTION OF THE DRAWING

The invention is elucidated in more detail in what follows by way of a working example shown in schematic drawings. There is shown in.

DETAILED DESCRIPTION OF PREFERRED EMBODIMENTS

Figure 1:
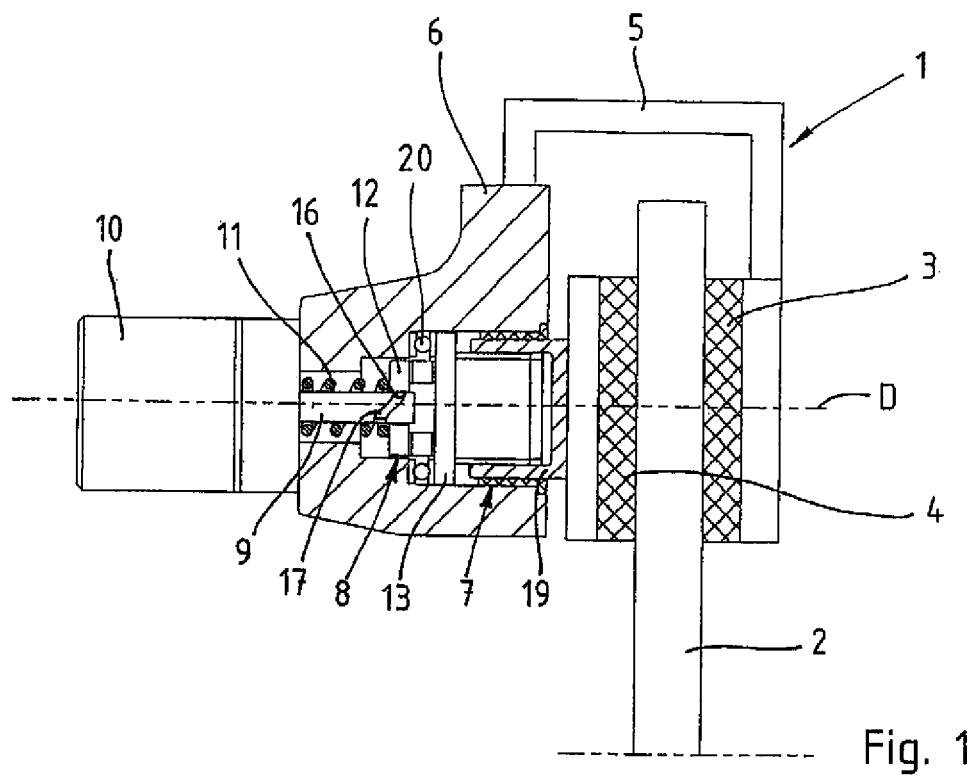
FIG. 1 a sectional view of the brake device according to the invention.

FIG. 1 shows a sectional view of a brake device 1 for reducing the speed of a brake body 2, which in the present embodiment is formed by a rotating brake disk. Mutually opposite brake elements 3 and 4 are pressed onto the brake disk, the right brake element 3 in the image plane being arranged in a stationary manner. The left brake element 4 in the image plane can be shifted in the axial direction of the brake device 1. The brake elements 3 and 4 are altogether retained or mounted on a brake caliper 5, overlapping the brake body 2.

The brake device 1 comprises a housing 6, connected to the brake caliper 5. In the housing 6 a conversion means 7 is provided on the one hand and a rotary impact mechanism 8 on the other hand. The rotary impact mechanism 8 is driven by a brake drive shaft 9, which, in turns is driven by a motor 10 which is connected to the housing 6. The rotational axis D of the brake drive shaft 9 forms the longitudinal axis of the brake device 1.

The brake drive shaft 9 is surrounded by a helical spring 11, which, on the one hand, takes support on the end face of the motor 10 facing the housing 6 and, on the other hand, presses an impact armature 12 of the rotary impact mechanism 8 against a driving wheel 13 of the rotary impact mechanism 8.

Figure 2:
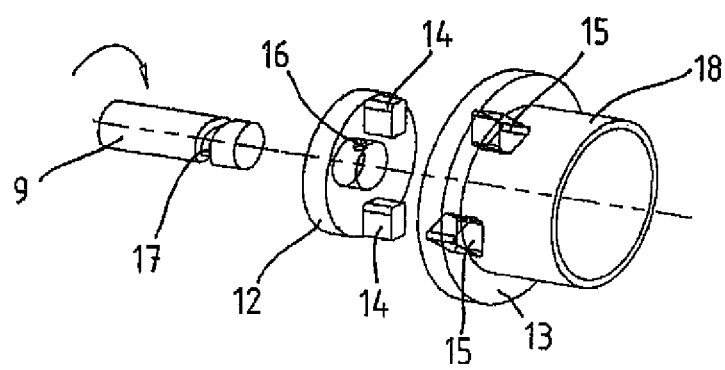
FIG. 2 a perspective view of the rotary impact mechanism of FIG. 1.

The brake drive shaft 9, the impact armature 12 and the driving wheel 13 are also shown in FIG. 2. It can be seen that the impact armature 12 comprises drivers 14 in the form of diametrically arranged cams, projecting in the axial direction, which engage with drivers 15 at the end face of the driving wheel 13, if the impact armature 12 is forced against the driving wheel 13 by the helical spring 11.

A driving pin 16 constitutes a further important component, projecting radially inwardly from the impact armature 12 and, in the installed position, engaging with a helical control groove 17.

In FIG. 1 the drivers 14 and 15 are in mutual engagement, the helical spring 11 forcing the impact armature 12 into the direction towards the driving wheel. Due to the configuration of the control groove 17, the impact armature 12 is in its extreme position, as it were, and has been shifted as far to the right as possible in the image plane of FIG. 1. If the motor 10 puts the brake drive shaft 9 into rotation, the impact armature 12 is initially moved synchronously with the driving wheel 13 until the latter comes to a rest when the brake element 4 abuts against the brake body 2. At this moment the further rotation of the brake drive shaft 9 causes the drivers 14 of the impact armature to disengage in that the driving pin 16 in the control groove 17 is shifted to the back, i.e. to the left in the image plane, against the elastic force of the helical spring 11. This causes the disengagement between the drivers 14 and 15 and the drivers 14 of the impact armature 12 to be transferred in order to be rotated further by 180° and simultaneously to be pressed once again into the direction towards the driving wheel 13 by the elastic force of the helical spring 11. The drivers 14 of the impact armature impact abruptly on the corresponding drivers 15 of the driving wheel 13, so that the latter is rotated a little further. This process is repeated several times until the driving wheel 13 comes to a standstill.

The driving wheel 13 forms an integral part of a threaded spindle 18, which in the present embodiment is configured as a hollow spindle. The threaded spindle 18 has an external thread and engages with a threaded cup 19, surrounding the threaded spindle 18. The threaded cup 19 is guided inside the housing 6 and is protected against axial twisting, so that the threaded cup 19 exclusively performs an axial movement induced by the rotation of the threaded spindle 18. This axial movement is used to displace the brake element 4 from a free-wheeling position into the braking position shown in FIG. 1. A braking force is applied in this case which is absorbed by an axial bearing 20 provided between an abutment shoulder of the housing 6 and the driving wheel 13. In the present embodiment, the axial bearing 20 is situated outside the inner region claimed by the driving pins 14 and 15, surrounding the region of the driving pins 14 and 15 in an annular fashion, as it were.

The driving pins 14 and 15 are configured in such a manner that the brake device 1 functions even if the rotational direction of the brake drive shaft 9 is reversed, so that the brake element 4 can be lifted off the brake body 2 after only a few rotations of the threaded spindle 18.

What is claimed is:

1. A brake device for reducing the speed of a moving brake body by pressing a brake element onto the brake body, a conversion means for converting a rotational movement of a brake drive shaft into a translation movement of the brake element in the direction towards the brake body being provided, wherein a rotary impact mechanism is fitted between the brake drive shaft and the conversion means, said rotary impact mechanism including an impact armature and an elastic member which is directly supported by the impact armature and configured to apply an elastic force by which the impact armature is urged in a direction of the brake element, wherein the rotary impact mechanism comprises a driving wheel, said impact armature and the driving wheel being pressed against one another by the elastic force so that the impact armature and the driving wheel are in engagement with one another via axially projecting drivers while transferring a torque from the brake drive shaft to the conversion means, in the course of which, by overcoming the elastic force and by separating the engaged impact armature from the driving wheel by shifting the brake drive shaft into the axial direction a transfer of the impact armature occurs, so that a rotary impact impulse is exerted on the driving wheel when rotation continues and wherein the impact armature engages with a helical control groove of the brake drive shaft via a driving pin.

2. The brake device of claim 1, wherein the rotary impact mechanism is a V-grooved rotary mechanism.

3. The brake device of claim 1, wherein the rotary impact mechanism is a cam rotary mechanism.

4. The brake device of claim 1, wherein the elastic member is a helical spring in surrounding relationship to the brake drive shaft.

5. The brake device of claim 1, wherein the driving wheel is connected to a threaded spindle of the conversion means.

6. The brake device of claim 5, wherein the driving wheel forms an integral part of a threaded spindle of the conversion means.

7. The brake device of claim 6, wherein the threaded spindle is in engagement with a threaded cup guided inside a housing and axially displaceable, the said threaded cup being connected to the brake element.

8. The brake device of claim 5, wherein threaded spindle has a self-locking pitch.

9. A brake device for reducing the speed of a moving brake body, comprising:
a brake element movable in a direction of the brake body;
a rotating brake drive shaft;
a conversion member converting a rotation of the brake drive shaft into a translation movement of the brake element in the direction towards the brake body, and
a rotary impact mechanism fitted between the brake drive shaft and the conversion, said rotary impact mechanism including an impact armature and an elastic member which is directly supported by the impact armature and configured to apply an elastic force by which the impact armature is urged in a direction of the brake element, wherein the rotary impact mechanism comprises a driving wheel having a first axially projecting driver, said impact armature having a second axially projecting driver and operatively connected to the brake drive shaft for movement between one position in which the impact armature is in engagement with the driving wheel via the first and second drivers, and another position in which the impact armature is disengaged from the driving wheel, said elastic member biasing the impact armature to seek the first position, said brake drive shaft interacting with the impact armature in such a way that a rotation of the brake drive shaft urges the impact armature to the first position to thereby transfer a torque from the brake drive shaft to the conversion member, and upon further rotation of the brake drive shaft the impact armature is moved in opposition to an elastic force by the elastic member to the second position to thereby allow a rotation of the impact armature in a first phase and application of a rotary impact impulse upon the driving wheel in a second phase as the impact armature is moved to the first position, and wherein the brake drive shaft has a helical control groove for engagement of a driving pin of the impact armature.

10. The brake device of claim 9, wherein the rotary impact mechanism is a V-grooved rotary mechanism.

11. The brake device of claim 9, wherein the rotary impact mechanism is a cam rotary mechanism.

12. The brake device of claim 9, wherein the elastic member is a helical spring in surrounding relationship to the brake drive shaft to exert the elastic force on the impact armature.

13. The brake device of claim 9, wherein the conversion member has a threaded spindle connected to the driving wheel.

14. The brake device of claim 13, wherein the driving wheel is formed in one piece with the threaded spindle.

15. The brake device of claim 14, further comprising a threaded cup connected to the brake element and guided inside a housing for axial displacement, said threaded spindle engaging the threaded cup.

16. The brake device of claim 13, wherein threaded spindle has a self-locking pitch.

* * * * *